No. 752,553. PATENTED FEB. 16, 1904.
C. HIGHERS.
SEED PLANTER.
APPLICATION FILED AUG. 20, 1903.
NO MODEL.
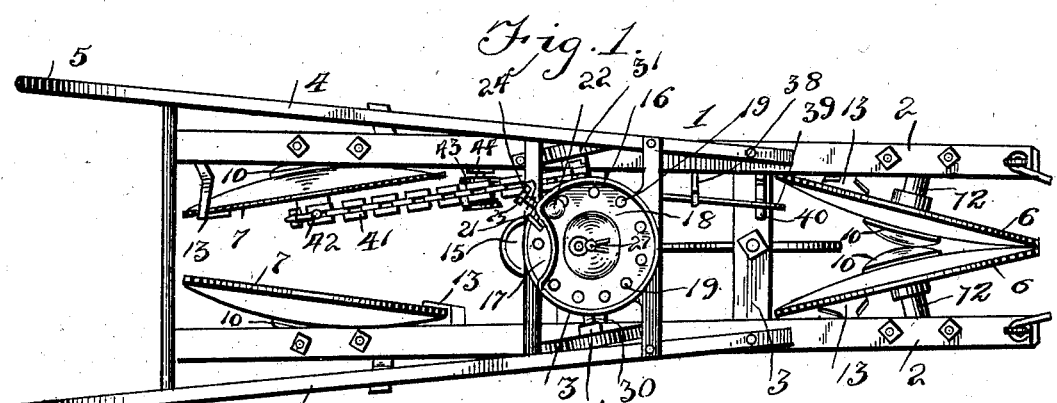
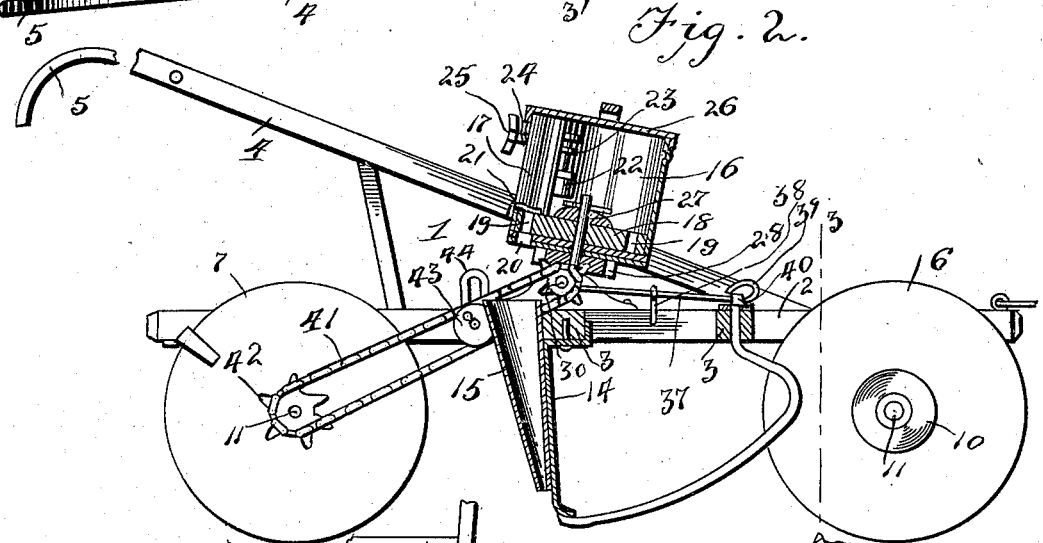
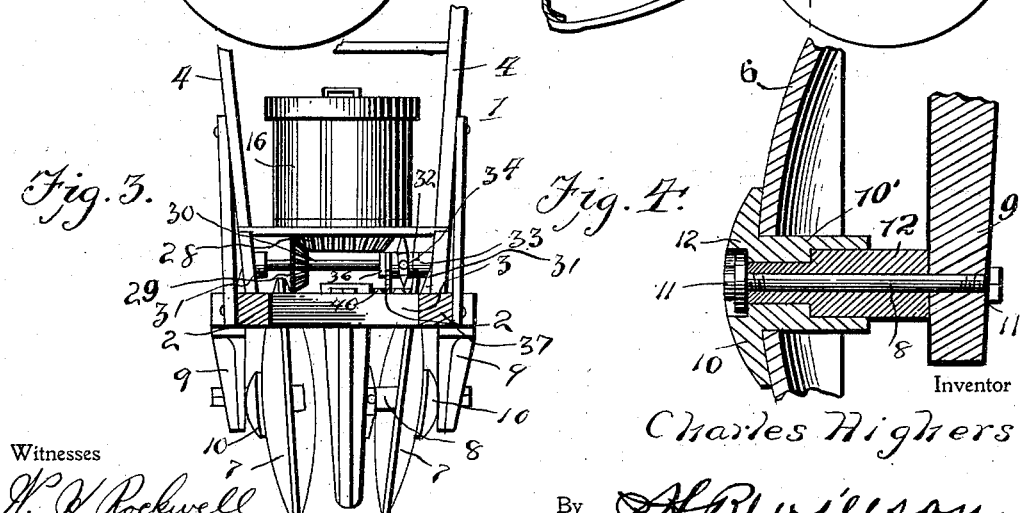
Witnesses
Inventor
Charles Highers
By
Attorney No. 752,553. Patented February 16, 1904.

UNITED STATES PATENT OFFICE.

CHARLES HIGHERS, OF VICKSBURG, KENTUCKY, ASSIGNOR OF ONE-HALF TO CHARLES WIGGENS, OF VICKSBURG, KENTUCKY.

SEED-PLANTER.

SPECIFICATION forming part of Letters Patent No. 752,553, dated February 16, 1904.

Application filed August 20, 1903. Serial No. 170,210. (No model.)

*To all whom it may concern:*

Be it known that I, CHARLES HIGHERS, a citizen of the United States, residing at Vicksburg, in the county of Livingston and State of Kentucky, have invented certain new and useful Improvements in Seed-Planters; and I do declare the following to be a full, clear, and exact description of the invention, such as will enable others skilled in the art to which it appertains to make and use the same.

My invention relates to certain new and useful improvements in seed-planters, and more particularly to that class used for planting corn.

The object of my invention is to provide a machine of this character which is simple in construction, durable in use, comparatively inexpensive of production, and efficient in operation.

With this and other objects in view the invention consists of certain novel features of construction, combination, and arrangement of parts, as will be more fully described, and particularly pointed out in the appended claims.

In the accompanying drawings, Figure 1 is a top plan view of my improved planter. Fig. 2 is a vertical longitudinal sectional view through the same. Fig. 3 is a vertical transverse sectional view taken on the line 3 3 of Fig. 2. Fig. 4 is a detail sectional view through one of the disks.

Referring to the drawings by numerals, 1 denotes the frame of my improved machine, which comprises two side beams 2, connected by cross-beams 3 and braced by inclined handle-bars 4, the upper and rear ends of which are formed with the usual handle-holds 5. Said frame is supported above the ground by two pairs of rotary disks. The disks of the forward pair 6 have their convex faces adjacent and are disposed at an angle to each other in divergent relation, as seen in Fig. 1, in order to open up a furrow as the machine moves forwardly, and the disks of the rear pair 7 have their concave faces adjacent and are disposed at an angle to each other in convergent relation, so as to cover up or close the furrow made by the forward pair. Said disks are journaled upon stub-axles 8, carried by depending hangers 9, secured to the under sides of the beams 2. Each of said disks is provided with a fixed hub 10, formed with an interior annular rib 10' to prevent the same from becoming disengaged from the axle, which latter is in the form of a bolt 11, upon which a sleeve or spindle 12 is placed to form a bearing for said hub, as clearly shown in Fig. 4 of the drawings. Each of the disks is provided with a scraper-blade 13, adapted to remove mud or earth from said disks as they revolve. The scrapers upon the forward pair of disks coact with the outer or concave faces of the same, and those upon the rear disks engage the inner or concave faces.

Secured to and depending from the center of the cross-bars 3 of the frame at a point intermediate of the two pairs of disks is a furrow-opening shoe 14, provided at its rear with a drill-tube 15, through which the grain or seeds drop from a hopper 16, mounted above the same upon the inclined handle-bars 4. Said hopper consists of a receptacle preferably cylindrical and provided at its rear with a portion of its side bent or curved inwardly, as shown at 17, in order to expose a portion of the upper surface of a rotary feeding-plate 18, disposed in the bottom of said hopper. Said plate is provided with an annular row of apertures or perforations 19, adapted to receive one or more seeds or kernels of grain as the plate revolves through the hopper and to discharge the same through an opening 20 in the bottom of the hopper directly above the drill-tube 15. A spring-knocker 21 is provided to force the seed out of said apertures as the plate revolves, and a brush 22 is provided within the hopper to prevent more than the desired number of seeds from passing out of the hopper in the apertures 19. Said brush is mounted to slide vertically in a guide 23 and is adapted to be held in an adjusted position by a binding or clamp screw 24, having a nut 25 upon the outside of the hopper. The top of the hopper may be closed by a suitable cover 26, as seen in Fig. 2.

In order to rotate the seed feeding or dropping plate 18, the same is secured to a vertical shaft 27, projecting through the bottom of the hopper and provided with a beveled gear 28, which meshes with a pinion 29, secured upon a transverse shaft 30, journaled in bearings 31 upon the upper sides of the side beams 2. Said shaft is provided with a fixed clutch member 32 and sliding clutch member 33, which is free to rotate independently of said shaft. Said sliding clutch member carries a sprocket-wheel 34 and an annular-grooved hub 36, the groove of which is engaged by the forked end of a shifting lever 37, pivoted at 38 upon a bracket projecting from one of the side beams 2. The handle 39 of said lever engages a rack 40 upon one of the cross-beams 3 to hold the sliding clutch member in or out of engagement with said fixed clutch member, as will be readily understood. Said sprocket-wheel 34 is connected by a sprocket-chain 41 to a sprocket-wheel 42, secured upon the hub of one of the rear disks 7, whereby said shaft 27 may be driven upon the rotation of said disks. An idler or tightening pulley or wheel 43 engages one stretch of the sprocket-chain in order to increase or decrease the tension of the same. Said pulley is journaled upon a stub-shaft carried by an adjustable bracket 44, secured to one of the side beams 2.

The operation of my invention will be readily understood from the foregoing description, taken in connection with the accompanying drawings. It will be seen that when the machine is drawn forwardly by a draft-animal attached to the bail or clevis at the front end of the frame the front pair of disks will open up a furrow, in which the shoe will drop the seed or grain, and the rear pair of disks will close the furrow to cover the seed. By employing seed-plates 18 with apertures 19 at a greater or less distance apart the dropping of the seed may be regulated as desired.

Various changes in the form, proportion, and the minor details of construction may be resorted to without departing from the principle or sacrificing any of the advantages of this invention.

Having thus described my invention, what I claim as new, and desire to secure by Letters Patent, is—

1. A planter comprising a supporting-frame having side bars, bearing-brackets depending therefrom, stub-shafts mounted upon said brackets in advance and in rear of the center of the frame, furrow-opening disks mounted upon the forward shafts and having their concave faces arranged in apposition and diverging from front to rear in the center line of the frame, furrow-closing disks mounted upon the rear shafts and having their inner faces converging from front to rear in the center line of the frame, a hopper supported upon the frame between the two sets of disks, a seed-drill leading from the hopper, and a furrow-opening chute supported from the frame in advance of the seed-drill and between the same and the furrow-opening disks and on a plane between said disks, substantially as described.

2. A planter comprising a supporting-frame provided with bearing-brackets and disks mounted upon said brackets, each of said disks being provided with a hub having an internal bearing-rib, a shaft connected to the brackets and extending through the hub, a sleeve encompassing said shaft and projecting into the hub and forming a bearing on which the disks rotate, one end of said sleeve bearing against one side of said rib, and a stop upon one end of the shaft engaging the other side of the rib, substantially as described.

In testimony whereof I have hereunto set my hand in presence of two subscribing witnesses.

CHARLES HIGHERS.

Witnesses:
J. D. CLOPTON,
J. FORT ABELL.